April 20, 1948. P. E. MERCIER 2,439,817
AIRCRAFT POWER PLANT OF JET PROPULSION TYPE
Filed Dec. 6, 1941
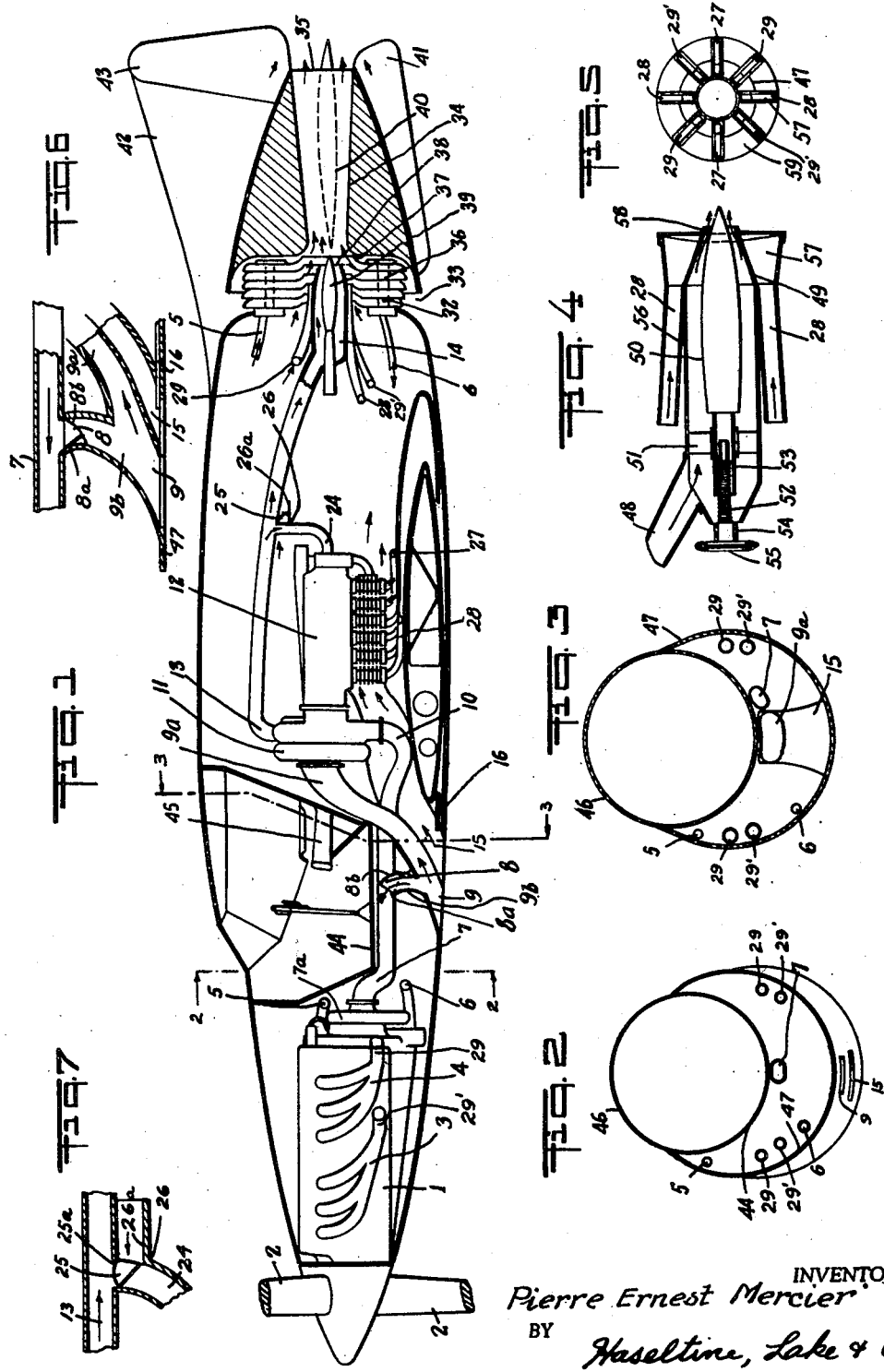
INVENTOR.
Pierre Ernest Mercier
BY Haseltine, Lake & Co.
ATTORNEYS Patented Apr. 20, 1948

2,439,817

UNITED STATES PATENT OFFICE 2,439,817

AIRCRAFT POWER PLANT OF JET PROPULSION TYPE

Pierre Ernest Mercier, Westport, Conn.

Application December 6, 1941, Serial No. 421,942

15 Claims. (Cl. 60—35.6)

1

This invention has reference to aircraft and may be considered to constitute an improvement upon and to include in novel combination certain of the structural features shown and described in my copending applications Serial No. 413,942, dated October 7, 1941, and Serial No. 419,152, dated November 14, 1941, and in my prior Patents 2,346,178, April 11, 1944, and 2,390,161, dated December 4, 1945.

In my Patent 2,390,161 I described the simultaneous feeding by means of one and the same compressor of an airplane engine and a propulsive nozzle. In my application Serial No. 413,942, dated October 7, 1941, I described how the lift drag ratio and the performances of an airplane may be improved by suction members judiciously arranged on the surface of the airplane combined with ejection nozzles directed to the rear.

One object of the present invention is to provide an aircraft having an improved power plant including an air compressor or supercharger and a rear propulsive nozzle in which a separate engine is provided for driving the compressor.

A further object of the invention is to provide means whereby below a certain altitude the compressed air from the compressor is used for the purpose of propulsion by means of a propulsive nozzle, while from a certain altitude upwards the whole or part of the output of said compressor is used to feed all or part of the airplane engines.

A further object of the invention is to supply the exhaust gases of the airplane engine and the exhaust gases of the auxiliary engine driving the compressor to a rear propulsive nozzle and to utilize air drawn in through intake slots to cool said exhaust gases while simultaneously using the energy of said air and exhaust gases in said propulsive nozzle.

Further objects of the invention will appear from the detailed description hereinafter given and from the appended claims.

According to one embodiment of the invention, in the case of a conventional combat plane, a second engine is arranged behind the pilot for driving the compressor, while the rear part of the fuselage is provided with a truncation corresponding to the outlet section of the propulsive nozzle.

According to a further feature of this invention the exhaust gases of the airplane engine or engines are employed parallelly with the compressed air as the motor fluid of the rear propulsive nozzle.

Finally, all the arrangements of suction slots and apertures for the reduction of the drag of the airplane members or the increase of the lift and the lift drag ratio for low speed flight, described in my copending application Serial No. 419,152, dated November 14, 1941, are applicable in the present case without thereby departing from the scope of the present invention.

The annexed figures show by way of non-limitative example the application of the invention to a combat plane of the usual type.

Fig. 1 shows in vertical section the fuselage of said apparatus.

Figs. 2 and 3 are diagrammatical sections of said fuselage taken on the lines 2—2 and 3—3, respectively.

Fig. 4 is a longitudinal section and Fig. 5 is an end view illustrating a modified form of the compressed air and exhaust gas injector of the rear propulsive nozzle associated with the fuselage of the airplane.

Fig. 6 is a detailed view of the damper valve connection 8 shown in Fig. 1.

Fig. 7 is a detailed view of the damper valve connection 25 shown in Fig. 1.

Referring to Figs. 1 and 2, the principal engine is shown at 1. It is of the liquid cooled type. Incomplete propeller blades are shown at 2. The exhaust gas offtake pipes from the cylinders of engine 1 are arranged in groups of three pipes, two groups at each side of the engine. These exhaust pipes lead to exhaust manifolds 3 and 4 which lead in turn respectively to pipes 29' and 29 as shown in Fig. 1. The pipes 29' and 29 conduct the exhaust gases to the rear of the fuselage where they are discharged to the propulsive nozzle. To simplify the drawings the pipes 29' and 29 are broken away adjacent the manifolds 3 and 4 as well as adjacent the propulsive nozzle.

Pipes shown cut at a certain distance from the engine 1 and serving for the cooling circulation are shown at 5 and 6. 7 is the air admission pipe for the compressor 7a of the engine 1. This pipe is provided with an air control valve or damper 8, pivoted at 8a and formed with an arcuate portion 8b adapted to swing into position across the pipe 7 and alternatively into position across the pipe 9b, Fig. 6, which causes it to communicate with either the exterior air intake 9, which feeds the independent compressor 11 through the pipe 9a, or with one of the delivery pipes 10 of the compressor 11, which is driven by the auxiliary engine 12. As shown in Fig. 1 the valve 8 is in closed position with respect to the pipe 10 thus cutting off delivery of compressed air from the compressor 11 to the compressor 7a by way of the pipe 7. In this position exterior air may be drawn into the pipe 7 through the connection 9b from the air intake 9. At the same time exterior air may be drawn through the intake 9 and connection 9a into the compressor 11 of the engine 12.

When the valve 8 is pivoted clockwise about 8a to the position shown in Fig. 6, it prevents passage of exterior air from 9 through the connection 9b directly to the air admission pipe 7 and engine 1.' In this position of the valve 8, compressed air from 11 is delivered through 10 to the compressor 7a of engine 1.

The second delivery pipe 13 of the compressor 11 ends at the injector system 14 of the rear propulsive nozzle. The cooling of the engine 12 (direct cooling type) is insured by means of an outside air intake 15, controlled by a slide valve 16 which is movable by suitable means (not shown) across the mouth of the passage 15 to regulate the amount of air led therethrough to the interior of the fuselage.

The air admission pipe to the air intake of the engine 12 is shown at 24. By means of the damper valve 25 pivoting about the axis 26, said pipe may be put into communication either with the air circulating in the fuselage when the valve is pivoted to the left, as shown in Fig. 7, or in communication with the delivery pipe 13 of the compressor 11 when the valve is in the position shown in Fig. 1, that is, for admission of the air to the pipe 24 while preventing flow of the air from within the fuselage into this pipe. The valve 25 has an arcuate portion 25a, as shown in Fig. 7, which cooperates with the wall of the pipe 24 and at its right hand end may abut the plate 26a when the valve is pivoted to the right from the position shown in Fig. 7. The exhaust pipes 27 and 28 of the engine 12 terminate at the periphery of the injector member 14 adjacent its point of discharge to the propulsive nozzle. The terminal portions of the pipes 27 and 28 and the terminal portions of the pipes 29 and 29', leading exhaust gases from the engine 1, are preferably symmetrically arranged about the compressed air injector member 14, as shown in Figs. 4 and 5, so as to promote mixing of the exhaust gases with the compressed air as well as with the air led to the propulsive nozzle from the fuselage or other sources.

The pipes 5 and 6 are broken away to permit clearer showing of the other features of the drawing but are shown at the right hand side of Fig. 1 as connected to the radiator 32, thus assuring a closed circulation of the cooling liquid between the engine and the radiator. The latter is supplied with air by means of an auxiliary slot 33, through which air is sucked in from the boundary layer at the rear part of the fuselage. The air thus taken in across the elements of the radiator 32, is expelled with force and speed through the throat 34 of the rear nozzle to issue at 35.

The radiator 32 represented in the drawing is of the type described in my U. S. Patent No. 2,346,178, dated April 11, 1944, but it is clear that any other radiator system may be employed without departing from the scope of the invention. The vanes forming the radiator 32 are assembled and interconnected by pipe sections arranged parallel to the axis of the nozzle, one of which sections is shown at 36. The air which has served for cooling the engine 12 passes between the body of the injector 14 and the radiator vanes 32. This air flows through the auxiliary passage, at 37. The control of the compressed air output injected through the propulsive nozzle is effected by means of the shell-shaped member 39, opposite the throat 38, which member 39 may be controlled and adjusted by any suitable means, for example, that described and illustrated in my Patent No. 2,390,161.

The section of the horizontal tail member is seen in dotted line at 40. The lower part of the vertical tail surface is shown at 41, the upper part at 42, and the rudder at 43. The cockpit floor is shown at 44, the pilot's seat at 45.

Referring to Figs. 2 and 3 it will be seen that the cockpit has in section a cylindrical form, at 46, upwards with respect to the floor; this form is advantageous as it admits of overpressure and flight at high altitudes. The lateral part of the outer wall of the fuselage is shown at 47. In Figs. 2 and 3 the pipes for the cooling liquid of the engine 1 are represented again at 5 and 6, the exhaust pipes 29, 29' and the air admission pipe 7 of the engine.

In Fig. 3 it will be seen that the pipe 7 has been diverted to allow the pipe 9a to pass.

Fig. 4 is a longitudinal section of a special form of embodiment of the injector of the rear propulsive nozzle. The injector has a cylindrical body 56, fed by the pipe 48; it terminates rearwardly in the truncated cone 49, into which the shell-shaped member 50 moves. This member is centered and prevented from rotating by a guide with profiled arms 51, and its position is determined by a screw 52, engaged in the threaded recess arranged in the tail 53 of the shell-shaped member 50. The screw 52 is held against longitudinal movement by means of a sleeve 54. Its rotation is controlled by the pulley or chain wheel 55, driven in a suitable manner known to the art.

The exhaust pipes 27, 28 and 29, 29' are arranged around the cylindrical body 56 and a little inclined relative to its axis; they end in the example under consideration in flattened parts such as 57, arranged in radial planes, as may be seen in the end view shown in Fig. 5.

The exhaust gases are led in this system to the entrance to the nozzle, being located between the compressed air escaping by the space 58 between the shell-shaped member 50 and the truncated cone 49, and the air coming from the intake 15 or the intake of the attachments or the suction slots in the wing, which exhaust gases taken in at the level of the injector enter the flattened pipes, 57, intermediate the spaces 59. By first cooling the gases, this arrangement offers the advantage that it eliminates flames and insures that the air is driven better by the exhaust gases.

It is clear that the control valves 8 and 25 have the purpose to feed the engines 1 and 12 with ordinary air or compressed air according to the altitude and the running of the engine. They may be actuated manually through suitable cable connections, not shown, by the pilot.

Having now fully described my invention, what I claim is:

1. In a power plant for aircraft, an internal combustion engine for normally supplying at least a substantial part of the energy required for propulsion of an aircraft, a rear propulsive nozzle, a supercharger for supplying compressed air to said engine and to said rear propulsive nozzle, a second internal combustion engine for driving said supercharger, said second engine being operable independently of said first mentioned engine, a device operable to cut off the supply of compressed air to said first engine whereby said supply is delivered to said nozzle, and means effective upon operation of said device for supplying atmospheric air to said first engine.

2. In a power plant for aircraft, an internal combustion engine for normally supplying at least a substantial part of the energy required for propulsion of an air aircraft, a rear propulsive nozzle, a supercharger, a connection for leading compressed air from said supercharger to said engine, a second connection for leading compressed air from said supercharger to said rear propulsive nozzle, a second engine for driving said supercharger, said second engine being operable independently of said first mentioned engine, and ejector means for causing external air to pass in substantially uncompressed condition in the vicinity of said second engine to cool it and to be ejected with said compressed air through the rear propulsive nozzle.

3. In a power plant for aircraft, an internal combustion engine, a rear propulsive nozzle, a supercharger for supplying compressed air to said engine and to said rear propulsive nozzle, a second internal combustion engine for driving said supercharger, said second engine being operable independently of said first mentioned engine, a device operable to cut off the supply of compressed air to said first engine whereby said supply is delivered to said nozzle, means effective upon operation of said device for supplying atmospheric air to said first engine, and connections for leading the exhaust gases from at least one of said engines to said rear propulsive nozzle.

4. In a power plant for aircraft, an internal combustion engine, a rear propulsive nozzle, a supercharger for supplying compressed air to said engine and to said rear propulsive nozzle, a second internal combustion engine for driving said supercharger, said second engine being operable independently of said first mentioned engine, and connections for leading the exhaust gases from both of said engines to said rear propulsive nozzle.

5. In a power plant for aircraft, an internal combustion engine, a rear propulsive nozzle, a supercharger, a connection for leading compressed air from said supercharger to said engine, a second connection for leading compressed air from said supercharger to said rear propulsive nozzle, a second engine for driving said supercharger, said second engine being operable independently of said first mentioned engine, ejector means for causing external air to pass in substantially uncompressed condition in the vicinity of said second engine to cool it and to be ejected with said compressed air through the rear propulsive nozzle, and means for leading the exhaust gases from at least one of the said engines to said propulsive nozzle.

6. In an aircraft, an engine, a rear propulsive nozzle, a supercharger, a connection for leading compressed air from said supercharger to said engine, a second connection for leading compressed air from said supercharger to said rear propulsive nozzle, a second engine for driving said supercharger, means located forwardly of said second engine for admitting external air and passing said air substantially uncompressed over said second engine to cool said second engine, means located rearwardly of said second engine for admitting external air to said rear propulsive nozzle, and connections from both of said engines leading the exhaust gases therefrom to said rear propulsive nozzle.

7. In a power plant for aircraft, an internal combustion engine, a rear propulsive nozzle, a supercharger for supplying compressed air to said engine and to said rear propulsive nozzle, a second internal combustion engine for driving said supercharger, and connections for leading the exhaust gases from both of said engines to said rear propulsive nozzle, said connections terminating in a series of flattened nozzles radially arranged about the axis of said rear propulsive nozzle adjacent the point of discharge of said compressed air thereto, whereby intermingling and exchange of heat between said gases and the compressed air discharged through said rear propulsive nozzle is produced.

8. In an aircraft, an engine, a rear propulsive nozzle, a supercharger for supplying compressed air to said engine and to said rear propulsive nozzle, a second engine for driving said supercharger, and connections for leading the exhaust gases from both of said engines to said rear propulsive nozzle, means for admitting external air and discharging it into said rear propulsive nozzle, said connections discharging the exhaust gases to said rear propulsive nozzle between the supply of compressed air coming from the supercharger and the external air discharging into said nozzle.

9. In a power plant for aircraft, an internal combustion engine for normally supplying at least a substantial part of the energy required for propulsion of an aircraft, a rear propulsive nozzle, a supercharger for supplying compressed air to said engine and to said rear propulsive nozzle, a second internal combustion engine for driving said supercharger, a conduit for admitting external air to said supercharger, a second conduit connecting said first conduit directly with the connection supplying compressed air from the supercharger to the first-mentioned engine, a device operable to cut off the supply of compressed air to said first engine whereby said supply is delivered to said nozzle, means effective upon operation of said device for supplying atmospheric air to said first engine, and means for regulating flow of external air through said second conduit to said connection.

10. In a power plant for aircraft, an internal combustion engine for normally supplying at least a substantial part of the energy required for propulsion of an aircraft, a rear propulsive nozzle, a supercharger for supplying compressed air to said engine and to said rear propulsive nozzle, a second internal combustion engine for driving said supercharger, a device operable to cut off the supply of compressed air to said first engine whereby said supply is delivered to said nozzle, means effective upon operation of said device for supplying atmospheric air to said first engine, a pipe for supplying air to said second engine, and a movable connection for optionally establishing communication between said pipe and the atmosphere about said second engine or with the connection leading compressed air from the supercharger to the rear propulsive nozzle.

11. In an aircraft, an engine, a rear propulsive nozzle, a supercharger, a connection for leading compressed air from said supercharger to said engine, a second connection for leading compressed air from said supercharger to said rear propulsive nozzle, a second engine for driving said supercharger, means located forwardly of said second engine for admitting external air to cool said second engine, means including vanes located rearwardly of said second engine for admitting and directing external air to said rear propulsive nozzle, and connections from at least one of said engines leading the exhaust gases therefrom to said rear propulsive nozzle.

12. In a power plant for aircraft, an internal combustion engine, a rear propulsive nozzle, a supercharger for supplying compressed air to said engine and to said rear propulsive nozzle, a second internal combustion engine for driving said supercharger, and connections for leading the exhaust gases from both of said engines to said rear propulsive nozzle, said connections terminating in a series of flattened nozzles radially arranged about the axis of said rear propulsive nozzle adjacent the point of discharge of said compressed air thereto, and means for admitting external air and causing it to flow in heat exchange relation between said flattened nozzles to said propulsive nozzle.

13. In an aircraft, an engine, a rear propulsive nozzle, a supercharger, a connection for leading compressed air from said supercharger to said engine, a second connection for leading compressed air from said supercharger to said rear propulsive nozzle, a movable member for controlling the supply of compressed air to said rear propulsive nozzle, a second engine for driving said supercharger, means located forwardly of said second engine for admitting external air to cool said second engine, means located rearwardly of said second engine for admitting external air to said rear propulsive nozzle, and connections from at least one of said engines leading the exhaust gases therefrom to said rear propulsive nozzle.

14. In a power plant for aircraft, an internal combustion engine, a rear propulsive nozzle, a supercharger for supplying compressed air to said engine and to said rear propulsive nozzle, a second internal combustion engine for driving said supercharger, connections for leading the exhaust gases from both of said engines to said rear propulsive nozzle, said connections terminating in a series of flattened nozzles arranged radially about the axis of and discharging into said rear propulsive nozzle, and means for directing cooling air in heat exchange relation to said exhaust gases and about said flattened nozzles prior to the discharge of said gases from said nozzles.

15. In an aircraft, an engine, a rear propulsive nozzle, a supercharger, a connection for leading compressed air from said supercharger to said engine, a second connection for leading compressed air from said supercharger to said rear propulsive nozzle, a second engine for driving said supercharger, said second engine being operable independently of said first mentioned engine, means located forwardly of said second engine for admitting external air for cooling said second engine, means located rearwardly of said second engine for admitting external air to said rear propulsive nozzle, and means for discharging exhaust gases from at least one of said engines into said nozzle adjacent the points of discharge thereinto of the compressed air and external air, and means for confining said exhaust gas and said air in heat exchanging relation during admission of said air to and while it and said exhaust gas are being ejected through said propulsive nozzle.

PIERRE ERNEST MERCIER.

REFERENCES CITED

The following references are of record in the file of this patent:

UNITED STATES PATENTS

| Number | Name | Date |
|---|---|---|
| 1,300,344 | Case | Apr. 15, 1919 |
| 1,758,374 | Riehm | May 13, 1930 |
| 2,304,008 | Müller | Dec. 1, 1942 |

FOREIGN PATENTS

| Number | Country | Date |
|---|---|---|
| 406,713 | Great Britain | Feb. 28, 1934 |
| 455,341 | Great Britain | Oct. 19, 1936 |
| 513,751 | Great Britain | Oct. 20, 1939 |
| 575,581 | France | Apr. 24, 1924 |
| 619,591 | France | Jan. 4, 1927 |
| 162,030 | Switzerland | May 31, 1933 |
| 184,378 | Switzerland | Aug. 1, 1936 |